United States Patent
Goel et al.

(10) Patent No.: US 10,257,665 B2
(45) Date of Patent: Apr. 9, 2019

(54) ANALYTICS ENGINES FOR IOT DEVICES

(71) Applicant: QUALCOMM Incorporated, San Diego, CA (US)

(72) Inventors: Amit Goel, San Diego, CA (US); Mohammed Ataur Rahman Shuman, San Diego, CA (US); Binita Gupta, San Diego, CA (US); Ashutosh Aggarwal, San Diego, CA (US); Sandeep Sharma, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 501 days.

(21) Appl. No.: 14/188,202

(22) Filed: Feb. 24, 2014

(65) Prior Publication Data
US 2014/0244836 A1 Aug. 28, 2014

Related U.S. Application Data

(60) Provisional application No. 61/769,127, filed on Feb. 25, 2013.

(51) Int. Cl.
*G06F 15/16* (2006.01)
*H04W 4/08* (2009.01)
(Continued)

(52) U.S. Cl.
CPC ........... *H04W 4/08* (2013.01); *H04L 12/2827* (2013.01); *H04W 4/70* (2018.02); *H02J 3/14* (2013.01);
(Continued)

(58) Field of Classification Search
CPC ...................................................... H04L 43/10
See application file for complete search history.

(56) References Cited

U.S. PATENT DOCUMENTS 8,332,500 B1 * 12/2012 Singleton ............... G06Q 10/10
709/203
8,473,325 B2 6/2013 Barnhill, Jr. et al.
(Continued)

FOREIGN PATENT DOCUMENTS

CN 1712820 A 12/2005
JP 2002258934 A 9/2002
(Continued)

OTHER PUBLICATIONS

International Search Report and Written Opinion—PCT/US2014/18278—ISA/EPO—dated Feb. 10, 2015.
(Continued)

*Primary Examiner* — Moustafa M Meky
*Assistant Examiner* — Sm Z Islam
(74) *Attorney, Agent, or Firm* — Muncy, Geissler, Olds & Lowe, P.C.

(57) ABSTRACT

Methods and apparatuses for optimizing performance using data from an Internet of Things (IoT) device with analytics engines. The method receives, from a requesting Internet of Things (IoT) device, a request for trend data of physical resource consumption based at least in part on a portion of received data from at least one of a plurality of IoT devices. The method retrieves, from memory of an analytics engine, at least the portion of the received data. The method calculates, in a calculator of the analytics engine, the trend data based on at least the portion of the received data. The method transmits, to the requesting IoT device, the calculated trend data, wherein the requesting IoT device adjusts parameters in an IoT device using the calculated trend data.

33 Claims, 11 Drawing Sheets

(51) Int. Cl.
  *H04L 12/28* (2006.01)
  *H04W 4/70* (2018.01)
  *H02J 3/14* (2006.01)
  *H02J 13/00* (2006.01)
  *H02J 3/00* (2006.01)

(52) U.S. Cl.
  CPC ..... *H02J 13/0079* (2013.01); *H02J 2003/003* (2013.01); *H02J 2003/143* (2013.01); *Y02B 70/325* (2013.01); *Y02B 70/3241* (2013.01); *Y02B 70/3266* (2013.01); *Y02B 70/3275* (2013.01); *Y02B 70/3283* (2013.01); *Y02B 90/2669* (2013.01); *Y04S 20/227* (2013.01); *Y04S 20/228* (2013.01); *Y04S 20/242* (2013.01); *Y04S 20/244* (2013.01); *Y04S 20/246* (2013.01); *Y04S 40/128* (2013.01)

(56) References Cited

U.S. PATENT DOCUMENTS

| | | | |
|---|---|---|---|
| 8,538,595 | B2 | 9/2013 | Lyren et al. |
| 2002/0120502 | A1 | 8/2002 | Sakaguchi |
| 2005/0055698 | A1* | 3/2005 | Sasaki ............... H04L 29/06 719/310 |
| 2006/0192686 | A1* | 8/2006 | Hashimoto ............ G08B 15/00 340/870.07 |
| 2008/0288625 | A1 | 11/2008 | Agarwal et al. |
| 2011/0153107 | A1* | 6/2011 | Kim .................... G06F 1/3203 700/295 |
| 2011/0161402 | A1* | 6/2011 | Anderson ............ H04L 43/0817 709/203 |
| 2011/0184574 | A1* | 7/2011 | Le Roux ............... G01D 4/004 700/291 |
| 2011/0264797 | A1* | 10/2011 | Matityahu ............... H04L 43/04 709/224 |
| 2012/0153725 | A1 | 6/2012 | Grohman |
| 2012/0197911 | A1 | 8/2012 | Banka et al. |
| 2012/0203508 | A1* | 8/2012 | Hamzaoui .......... G05B 23/0232 702/183 |
| 2013/0275572 | A1* | 10/2013 | Schaetzle ............... H04L 41/08 709/223 |
| 2013/0326274 | A1* | 12/2013 | Olgaard .............. G06F 11/2733 714/32 |
| 2015/0201022 | A1* | 7/2015 | Kim ..................... H04W 4/005 709/203 |

FOREIGN PATENT DOCUMENTS

| | | |
|---|---|---|
| JP | 2011129085 A | 6/2011 |
| JP | 2013005521 A | 1/2013 |
| WO | 2014010784 A1 | 1/2014 |

OTHER PUBLICATIONS

Barnaghi P., et al., "Semantics for the Internet of Things: early progress and back to the future," Accessed on Dec. 4, 2013, 22 pages.
Supplementary European Search Report—EP14712384—Search Authority—The Hague—dated Sep. 22, 2016.

* cited by examiner

ANALYTICS ENGINES FOR IOT DEVICES

The present Application claim for Patent claims the benefit of Provisional Patent Application Ser. No. 61/769,127, entitled "ANALYTICS ENGINES FOR IOT DEVICES," filed Feb. 25, 2013, pending, and assigned to the assignee hereof, and the contents of which are expressly incorporated herein by reference in their entirety.

BACKGROUND OF THE INVENTION

1. Field of the Invention

The disclosure is directed to optimizing performance of an Internet of Things (IoT) device using an analytics engine.

2. Description of the Related Art

The Internet is a global system of interconnected computers and computer networks that use a standard Internet protocol suite (e.g., the Transmission Control Protocol (TCP) and Internet Protocol (IP)) to communicate with each other. The Internet of Things (IoT) is based on the idea that everyday objects, not just computers and computer networks, can be readable, recognizable, locatable, addressable, and controllable via an IoT communications network (e.g., an ad-hoc system or the Internet).

A number of market trends are driving development of IoT devices. For example, increasing energy costs are driving governments' strategic investments in smart grids and support for future consumption, such as for electric vehicles and public charging stations. Increasing health care costs and aging populations are driving development for remote/connected health care and fitness services. A technological revolution in the home is driving development for new "smart" services, including consolidation by service providers marketing 'N' play (e.g., data, voice, video, security, energy management, etc.) and expanding home networks. Buildings are getting smarter and more convenient as a means to reduce operational costs for enterprise facilities.

There are a number of key applications for the IoT. For example, in the area of smart grids and energy management, utility companies can optimize delivery of energy to homes and businesses while customers can better manage energy usage. In the area of home and building automation, smart homes and buildings can have centralized control over virtually any device or system in the home or office, from appliances to plug-in electric vehicle (PEV) security systems. In the field of asset tracking, enterprises, hospitals, factories, and other large organizations can accurately track the locations of high-value equipment, patients, vehicles, and so on. In the area of health and wellness, doctors can remotely monitor patients' health while people can track the progress of fitness routines.

SUMMARY

The disclosure is directed to optimizing performance of an Internet of Things (IoT) device using an analytics engine.

For example, an exemplary embodiment is directed to a method for optimizing performance using data from an Internet of Things (IoT) device with analytics engines, the method comprising: receiving, from a requesting Internet of Things (IoT) device, a request for trend data of physical resource consumption based at least in part on a portion of received data from at least one of a plurality of IoT devices; retrieving, from memory of an analytics engine, at least the portion of the received data; calculating, in a calculator of the analytics engine, the trend data based on at least the portion of the received data; and transmitting, to the requesting IoT device, the calculated trend data, wherein the requesting IoT device adjusts parameters in an IoT device using the calculated trend data Another exemplary embodiment is directed to an apparatus comprising: a processor configured to optimize performance using data from an Internet of Things (IoT) device with analytics engines; logic configured to receive, from a requesting Internet of Things (IoT) device, a request for trend data of physical resource consumption based at least in part on a portion of received data from at least one of a plurality of IoT devices; logic configured to retrieve, from memory of an analytics engine, at least the portion of the received data; logic configured to calculate, in a calculator of the analytics engine, the trend data based on at least the portion of the received data; and logic configured to transmit, to the requesting IoT device, the calculated trend data, wherein the requesting IoT device adjusts parameters in an IoT device using the calculated trend data.

Still another exemplary embodiment is directed to an analytics engine comprising: a receiver to receive, from a requesting Internet of Things (IoT) device, a request for trend data of physical resource consumption based at least in part on a portion of received data from at least one of a plurality of IoT devices; a data retriever to retrieve, from memory of an analytics engine, at least the portion of the received data; a calculator to calculate, in a calculator of the analytics engine, the trend data based on at least the portion of the received data; and a transmitter, to the requesting IoT device, the calculated trend data, wherein the requesting IoT device adjusts parameters in an IoT device using the calculated trend data.

Yet another exemplary embodiment is directed to a non-transitory computer-readable storage medium comprising code, which, when executed by a processor, causes the processor to perform operations for optimizing performance using data from an Internet of Things (IoT) device with analytics engines; code for receiving, from a requesting Internet of Things (IoT) device, a request for trend data of physical resource consumption based at least in part on a portion of received data from at least one of a plurality of IoT devices; code for retrieving, from memory of an analytics engine, at least the portion of the received data; code for calculating, in a calculator of the analytics engine, the trend data based on at least the portion of the received data; and code for transmitting, to the requesting IoT device, the calculated trend data, wherein the requesting IoT device adjusts parameters in an IoT device using the calculated trend data.

An IoT device can follow a unified vocabulary and produce a large amount of data and/or events that an analytics engine can consume. The analytics engine can determine useful trends from the consumed data and/or events, which, in turn, can be made available to users and everyday objects to optimize performance.

BRIEF DESCRIPTION OF THE DRAWINGS

A more complete appreciation of aspects of the disclosure and many of the attendant advantages thereof will be readily obtained as the same becomes better understood by reference to the following detailed description when considered in connection with the accompanying drawings which are presented solely for illustration and not limitation of the disclosure, and in which:

FIG. 2A illustrates an exemplary Internet of Things (IoT) device in accordance with aspects of the disclosure, while

DETAILED DESCRIPTION

Figure 1A:
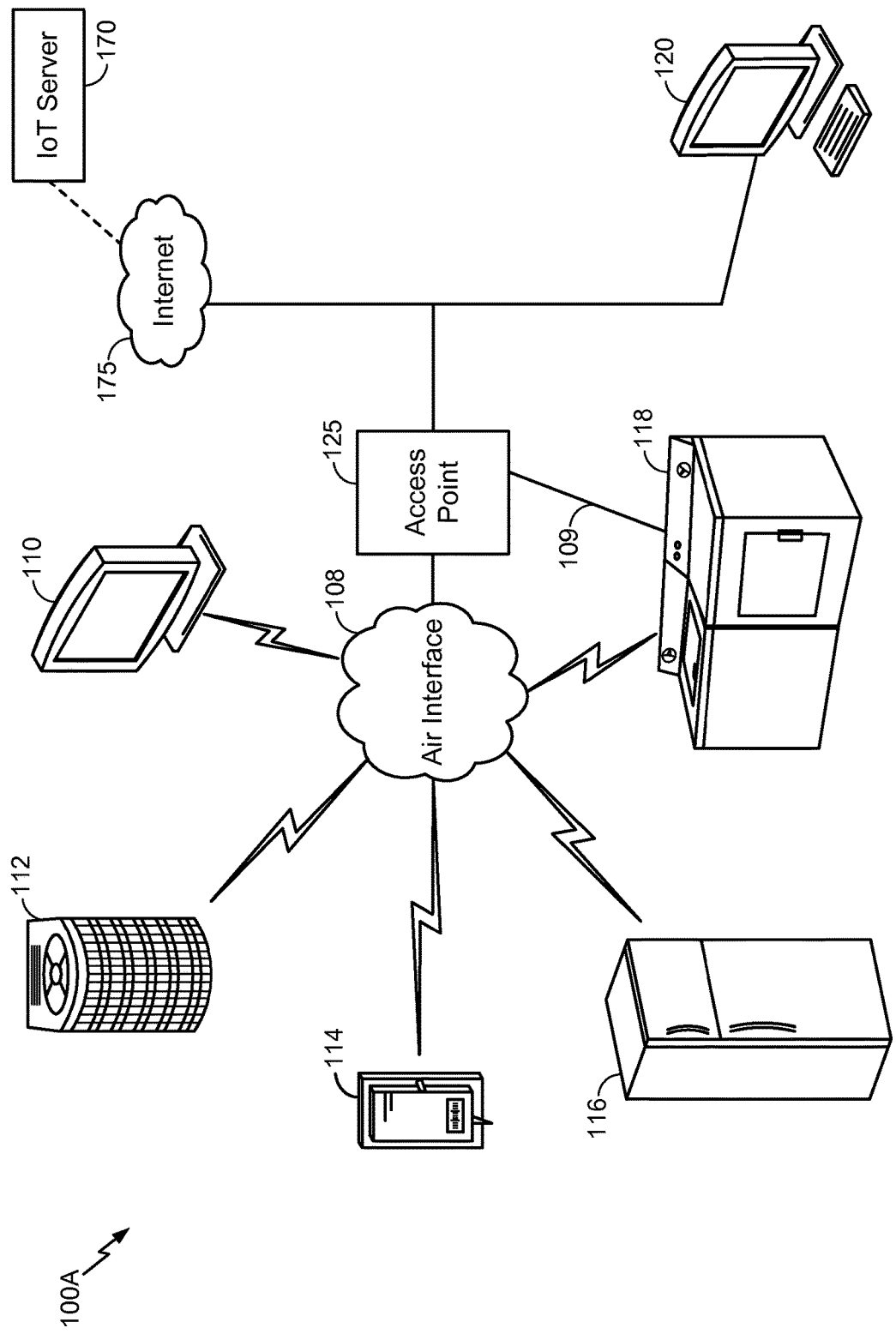
FIG. 1A illustrates a high-level system architecture of a wireless communications system in accordance with an aspect of the disclosure.

Various aspects are disclosed in the following description and related drawings. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, these sequence of actions described herein can be considered to be embodied entirely within any form of computer readable storage medium having stored therein a corresponding set of computer instructions that upon execution would cause an associated processor to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the term "Internet of Things (IoT) device" is used to refer to an electronic device (e.g., an appliance, a sensor, etc.) with a particular set of device attributes (e.g., a cooling or heating function, an environmental monitoring or recording function, a light-emitting function, a sound-emitting function, etc.) that can be embedded with and/or controlled/monitored by a central processing unit (CPU), microprocessor, application specific integrated circuit (ASIC), or the like, and configured for connection to an IoT network such as a local ad-hoc network or the Internet. For example, IoT devices may include, but are not limited to, refrigerators, toasters, ovens, microwaves, freezers, dishwashers, clothes washers, clothes dryers, furnaces, air conditioners, thermostats, televisions, light fixtures, vacuum cleaners, electricity meters, gas meters, etc., so long as the devices are equipped with a communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

FIG. 1A illustrates a high-level system architecture of a wireless communications system 100A in accordance with an aspect of the disclosure. The wireless communications system 100A contains a plurality of IoT devices, which include a television 110, an outdoor air conditioning unit 112, a thermostat 114, a refrigerator 116, and a washer and dryer 118.

Referring to FIG. 1A, IoT devices 110-118 are configured to communicate with an access network (e.g., an access point 125) over a physical communications interface or layer, shown in FIG. 1A as air interface 108 and a direct wired connection 109. The air interface 108 can comply with a wireless Internet protocol (IP), such as IEEE 802.11. Although FIG. 1A illustrates IoT devices 110-118 communicating over the air interface 108 and IoT device 118 communicating over the wired connection 109, each IoT device may communicate over a wired or wireless connection, or both.

The Internet 175 includes a number of routing agents and processing agents (not shown in FIG. 1A for the sake of convenience). The Internet 175 is a global system of interconnected computers and computer networks that uses a standard Internet protocol suite (e.g., the Transmission Control Protocol (TCP) and IP) to communicate among disparate devices/networks. TCP/IP provides end-to-end connectivity specifying how data should be formatted, addressed, transmitted, routed and received at the destination.

In FIG. 1A, a computer 120, such as a desktop or personal computer (PC), is shown as connecting to the Internet 175 directly (e.g., over an Ethernet connection or Wi-Fi or 802.11-based network). The computer 120 may have a wired connection to the Internet 175, such as a direct connection to a modem or router, which, in an example, can correspond to the access point 125 itself (e.g., for a Wi-Fi router with both wired and wireless connectivity). Alternatively, rather than being connected to the access point 125 and the Internet 175 over a wired connection, the computer 120 may be connected to the access point 125 over air interface 108 or another wireless interface, and access the Internet 175 over the air interface 108. Although illustrated as a desktop computer, computer 120 may be a laptop computer, a tablet computer, a PDA, a smart phone, or the like. The computer 120 may be an IoT device and/or contain functionality to manage an IoT network/group, such as the network/group of IoT devices 110-118.

The access point 125 may be connected to the Internet 175 via, for example, an optical communication system, such as FiOS, a cable modem, a digital subscriber line (DSL) modem, or the like. The access point 125 may communicate with IoT devices 110-118/120 and the Internet 175 using the standard Internet protocols (e.g., TCP/IP).

Referring to FIG. 1A, an IoT server 170 is shown as connected to the Internet 175. The IoT server 170 can be implemented as a plurality of structurally separate servers, or alternately may correspond to a single server. In an aspect, the IoT server 170 is optional (as indicated by the dotted line), and the group of IoT devices 110-118/120 may be a peer-to-peer (P2P) network. In such a case, the IoT devices 110-118/120 can communicate with each other directly over the air interface 108 and/or the wired connection 109. Alternatively, or additionally, some or all of IoT devices 110-118/120 may be configured with a communication interface independent of air interface 108 and wired connection 109. For example, if the air interface 108 corresponds to a WiFi interface, one or more of the IoT devices 110-118/120 may have Bluetooth or NFC interfaces for communicating directly with each other or other Bluetooth or NFC-enabled devices.

In a peer-to-peer network, service discovery schemes can multicast the presence of nodes, their capabilities, and group membership. The peer-to-peer devices can establish associations and subsequent interactions based on this information.

Figure 1B:
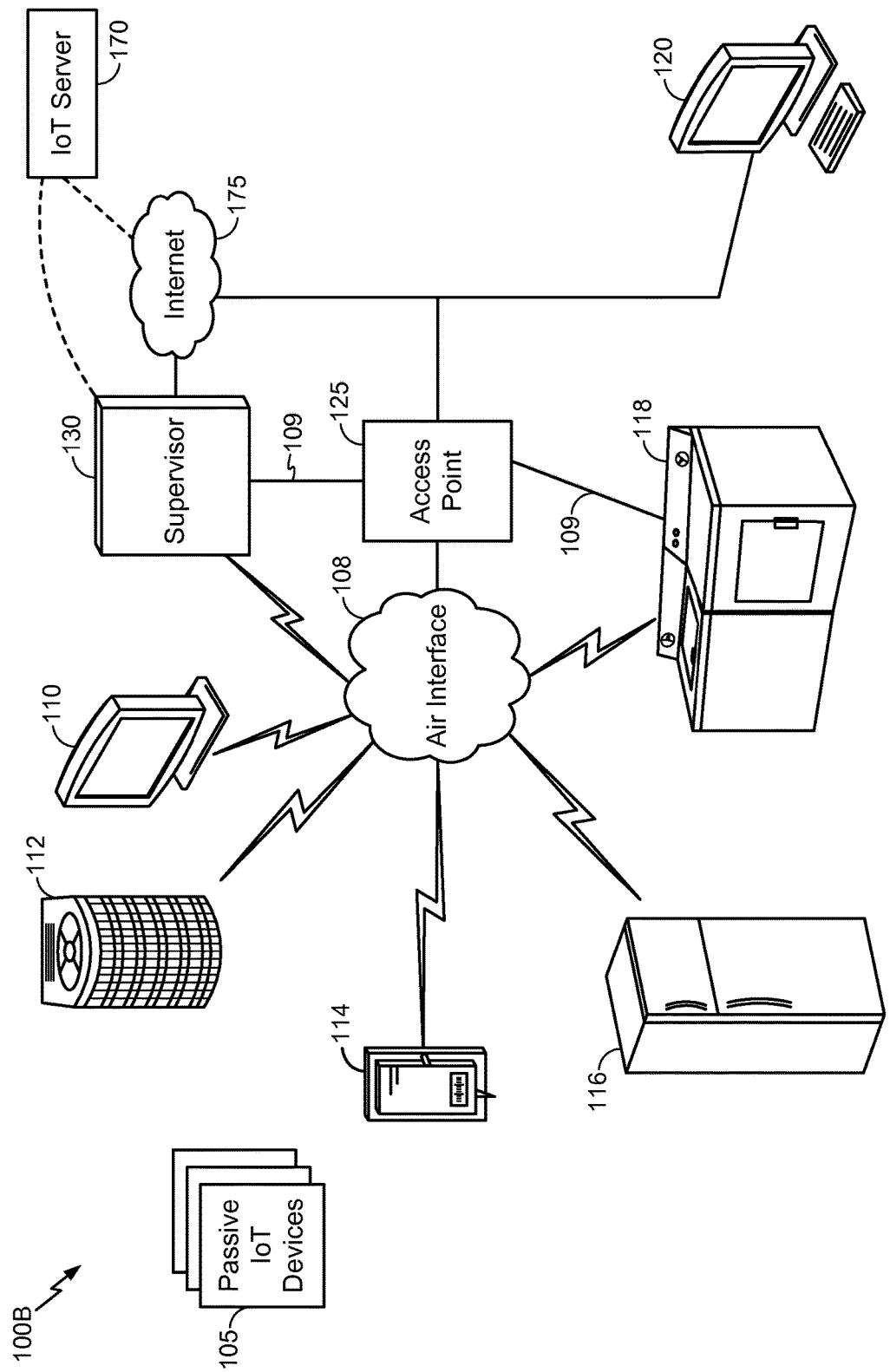
FIG. 1B illustrates a high-level system architecture of a wireless communications system in accordance with an aspect of the disclosure.

In accordance with an aspect of the disclosure, FIG. 1B illustrates a high-level architecture of another wireless communications system 100B that contains a plurality of IoT devices. In general, the wireless communications system 100B shown in FIG. 1B may include various components that are the same and/or substantially similar to the wireless communications system 100A shown in FIG. 1A, which was described in greater detail above (e.g., various IoT devices, including a television 110, outdoor air conditioning unit 112, thermostat 114, refrigerator 116, and washer and dryer 118, that are configured to communicate with an access point 125 over an air interface 108 and/or a direct wired connection 109, a computer 120 that directly connects to the Internet 175 and/or connects to the Internet 175 through access point 125, and an IoT server 170 accessible via the Internet 175, etc.). As such, for brevity and ease of description, various details relating to certain components in the wireless communications system 100B shown in FIG. 1B may be omitted herein to the extent that the same or similar details have already been provided above in relation to the wireless communications system 100A illustrated in FIG. 1A.

Referring to FIG. 1B, the wireless communications system 100B may include a supervisor device 130 that may be used to observe, monitor, control, or otherwise manage the various other components in the wireless communications system 100B. For example, the supervisor device 130 can communicate with an access network (e.g., access point 125) over air interface 108 and/or a direct wired connection 109 to monitor or manage attributes, activities, or other states associated with the various IoT devices 110-118/120 in the wireless communications system 100B. The supervisor device 130 may have a wired or wireless connection to the Internet 175 and optionally to the IoT server 170 (shown as a dotted line). The supervisor device 130 may obtain information from the Internet 175 and/or the IoT server 170 that can be used to further monitor or manage attributes, activities, or other states associated with the various IoT devices 110-118/120. The supervisor device 130 may be a standalone device or one of IoT devices 110-118/120, such as computer 120. The supervisor device 130 may be a physical device or a software application running on a physical device. The supervisor device 130 may include a user interface that can output information relating to the monitored attributes, activities, or other states associated with the IoT devices 110-118/120 and receive input information to control or otherwise manage the attributes, activities, or other states associated therewith. Accordingly, the supervisor device 130 may generally include various components and support various wired and wireless communication interfaces to observe, monitor, control, or otherwise manage the various components in the wireless communications system 100B.

The wireless communications system 100B shown in FIG. 1B may include one or more passive IoT devices 105 (in contrast to the active IoT devices 110-118/120) that can be coupled to or otherwise made part of the wireless communications system 100B. In general, the passive IoT devices 105 may include barcoded devices, Bluetooth devices, radio frequency (RF) devices, RFID tagged devices, infrared (IR) devices, NFC tagged devices, or any other suitable device that can provide its identifier and attributes to another device when queried over a short range interface. Active IoT devices may detect, store, communicate, act on, and/or the like, changes in attributes of passive IoT devices.

For example, passive IoT devices 105 may include a coffee cup and a container of orange juice that each have an RFID tag or barcode. A cabinet IoT device and the refrigerator IoT device 116 may each have an appropriate scanner or reader that can read the RFID tag or barcode to detect when the coffee cup and/or the container of orange juice passive IoT devices 105 have been added or removed. In response to the cabinet IoT device detecting the removal of the coffee cup passive IoT device 105 and the refrigerator IoT device 116 detecting the removal of the container of orange juice passive IoT device, the supervisor device 130 may receive one or more signals that relate to the activities detected at the cabinet IoT device and the refrigerator IoT device 116. The supervisor device 130 may then infer that a user is drinking orange juice from the coffee cup and/or likes to drink orange juice from a coffee cup.

Although the foregoing describes the passive IoT devices 105 as having some form of RFID tag or barcode communication interface, the passive IoT devices 105 may include one or more devices or other physical objects that do not have such communication capabilities. For example, certain IoT devices may have appropriate scanner or reader mechanisms that can detect shapes, sizes, colors, and/or other observable features associated with the passive IoT devices 105 to identify the passive IoT devices 105. In this manner, any suitable physical object may communicate its identity and attributes and become part of the wireless communication system 100B and be observed, monitored, controlled, or otherwise managed with the supervisor device 130. Further, passive IoT devices 105 may be coupled to or otherwise made part of the wireless communications system 100A shown in FIG. 1A and observed, monitored, controlled, or otherwise managed in a substantially similar manner.

Figure 1C:
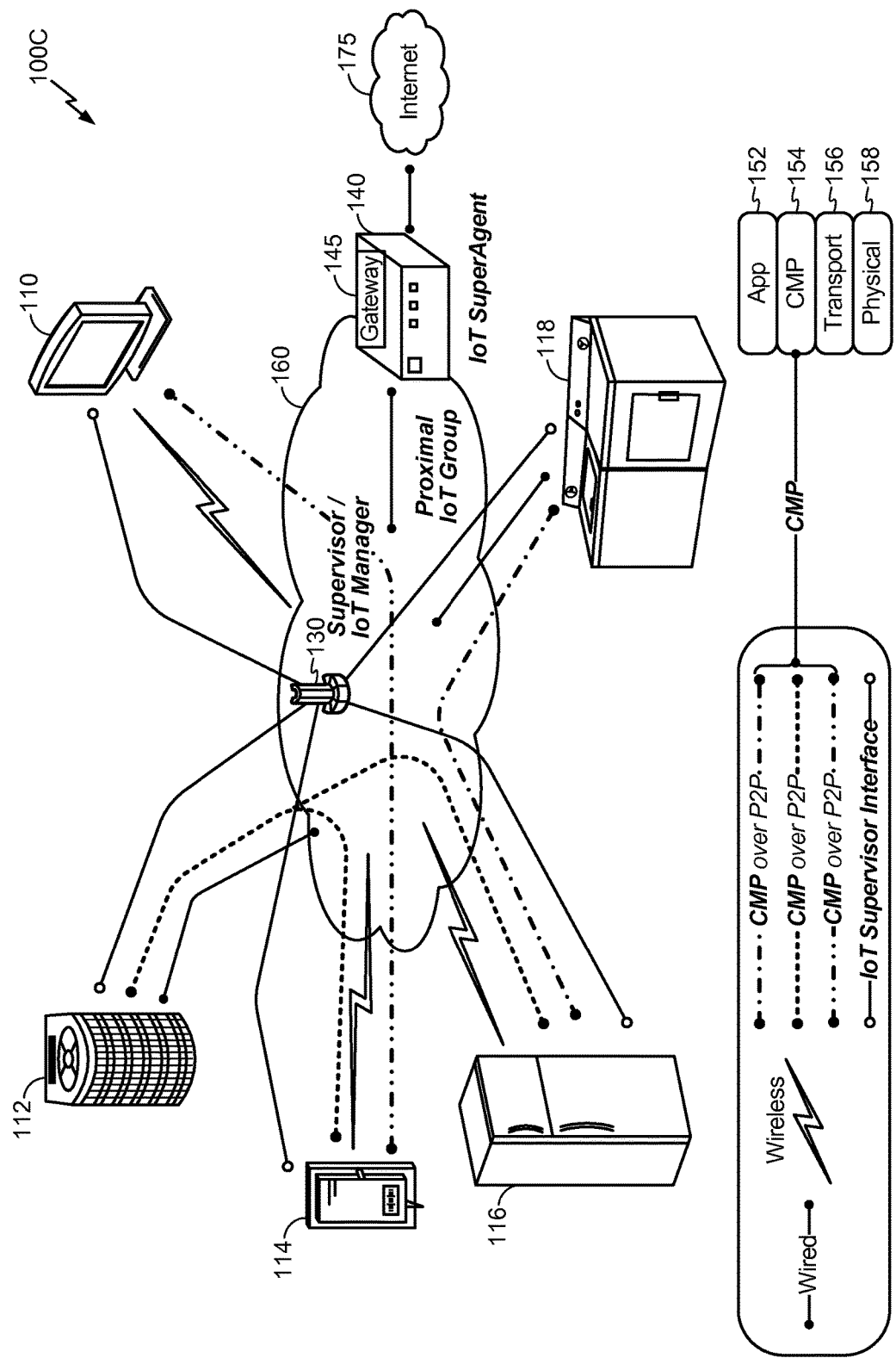
FIG. 1C illustrates a high-level system architecture of a wireless communications system in accordance with an aspect of the disclosure.

In accordance with another aspect of the disclosure, FIG. 1C illustrates a high-level architecture of another wireless communications system 100C that contains a plurality of IoT devices. In general, the wireless communications system 100C shown in FIG. 1C may include various components that are the same and/or substantially similar to the wireless communications systems 100A and 100B shown in FIGS. 1A and 1B, respectively, which were described in greater detail above. As such, for brevity and ease of description, various details relating to certain components in the wireless communications system 100C shown in FIG. 1C may be omitted herein to the extent that the same or similar details have already been provided above in relation to the wireless communications systems 100A and 100B illustrated in FIGS. 1A and 1B, respectively.

The communications system 100C shown in FIG. 1C illustrates exemplary peer-to-peer communications between the IoT devices 110-118 and the supervisor device 130. As shown in FIG. 1C, the supervisor device 130 communicates with each of the IoT devices 110-118 over an IoT supervisor interface. Further, IoT devices 110 and 114, IoT devices 112, 114, and 116, and IoT devices 116 and 118, communicate directly with each other.

The IoT devices 110-118 make up a proximal IoT group 160. A proximal IoT group is a group of locally connected IoT devices, such as the IoT devices connected to a user's home network. Although not shown, multiple proximal IoT groups may be connected to and/or communicate with each other via an IoT SuperAgent 140 connected to the Internet 175. At a high level, the supervisor device 130 manages intra-group communications, while the IoT SuperAgent 140 can manage inter-group communications. Although shown as separate devices, the supervisor device 130 and the IoT SuperAgent 140 may be, or reside on, the same device. This may be a standalone device or an IoT device, such as computer 120 in FIG. 1A. Alternatively, the IoT SuperAgent 140 may correspond to or include the functionality of the access point 125. As yet another alternative, the IoT SuperAgent 140 may correspond to or include the functionality of an IoT server, such as IoT server 170. The IoT SuperAgent 140 may encapsulate gateway functionality 145.

Each IoT device 110-118 can treat the supervisor device 130 as a peer and transmit attribute/schema updates to the supervisor device 130. When an IoT device needs to communicate with another IoT device, it can request the pointer to that IoT device from the supervisor device 130 and then communicate with the target IoT device as a peer. The IoT devices 110-118 communicate with each other over a peer-to-peer communication network using a common messaging protocol (CMP). As long as two IoT devices are CMP-enabled and connected over a common communication transport, they can communicate with each other. In the protocol stack, the CMP layer 154 is below the application layer 152 and above the transport layer 156 and the physical layer 158.

Figure 1D:
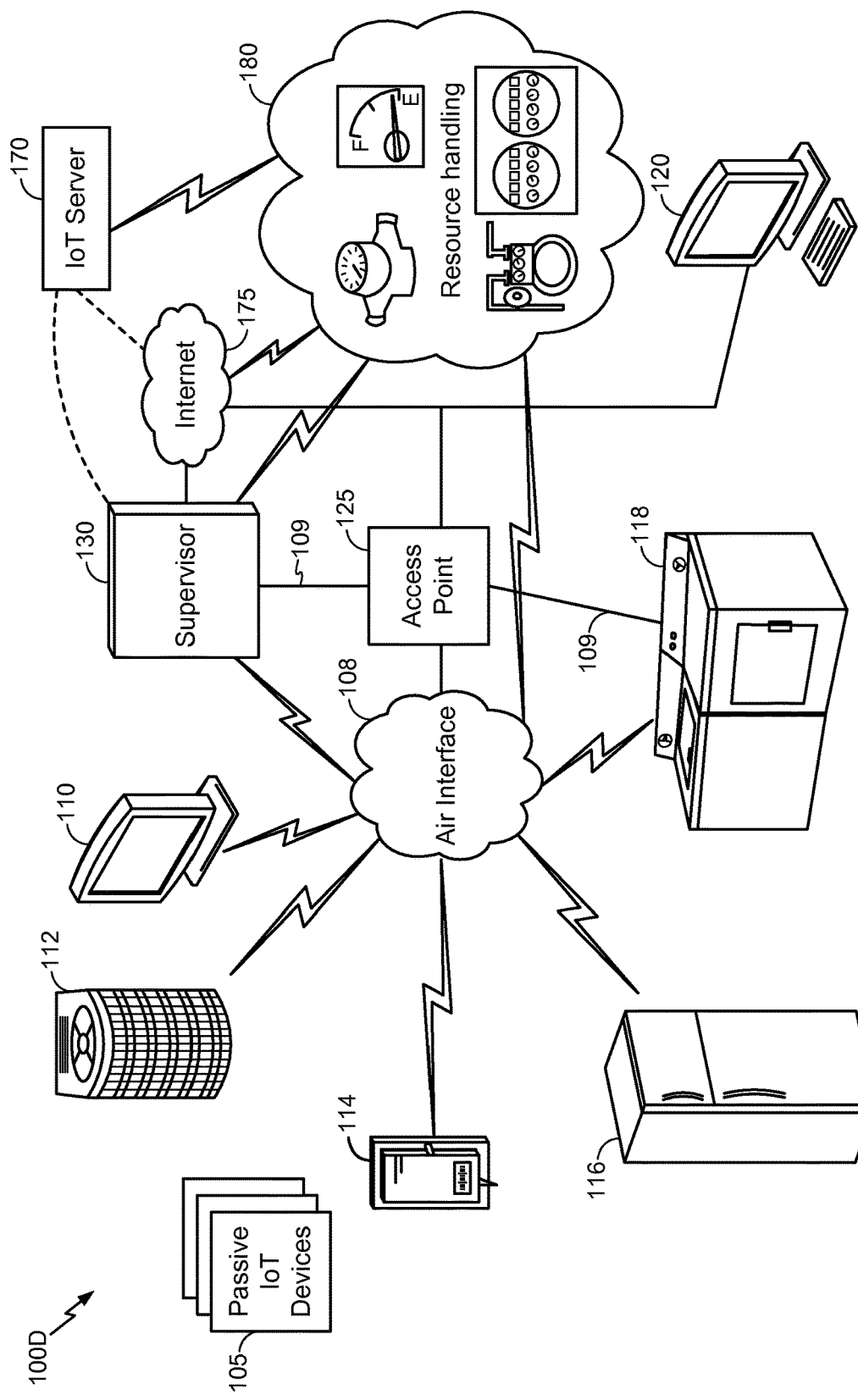
FIG. 1D illustrates a high-level system architecture of a wireless communications system in accordance with an aspect of the disclosure.

In accordance with another aspect of the disclosure, FIG. 1D illustrates a high-level architecture of another wireless communications system 100D that contains a plurality of IoT devices. In general, the wireless communications system 100D shown in FIG. 1D may include various components that are the same and/or substantially similar to the wireless communications systems 100A-C shown in FIGS. 1A-C, respectively, which were described in greater detail above. As such, for brevity and ease of description, various details relating to certain components in the wireless communications system 100D shown in FIG. 1D may be omitted herein to the extent that the same or similar details have already been provided above in relation to the wireless communications systems 100A-C illustrated in FIGS. 1A-C, respectively.

The Internet 175 is a "resource" that can be regulated using the concept of the IoT. However, the Internet 175 is just one example of a resource that is regulated, and any resource could be regulated using the concept of the IoT. Other resources that can be regulated include, but are not limited to, electricity, gas, storage, security, and the like. An IoT device may be connected to the resource and thereby regulate it, or the resource could be regulated over the Internet 175. FIG. 1D illustrates several resources 180, such as natural gas, gasoline, hot water, and electricity, wherein the resources 180 can be regulated in addition to and/or over the Internet 175.

IoT devices can communicate with each other to regulate their use of a resource 180. For example, IoT devices such as a toaster, a computer, and a hairdryer may communicate with each other over a Bluetooth communication interface to regulate their use of electricity (the resource 180). As another example, IoT devices such as a desktop computer, a telephone, and a tablet computer may communicate over a WiFi communication interface to regulate their access to the Internet 175 (the resource 180). As yet another example, IoT devices such as a stove, a clothes dryer, and a water heater may communicate over a WiFi communication interface to regulate their use of gas. Alternatively, or additionally, each IoT device may be connected to an IoT server, such as IoT server 170, that has logic to regulate their use of the resource 180 based on information received from the IoT devices.

Figure 1E:
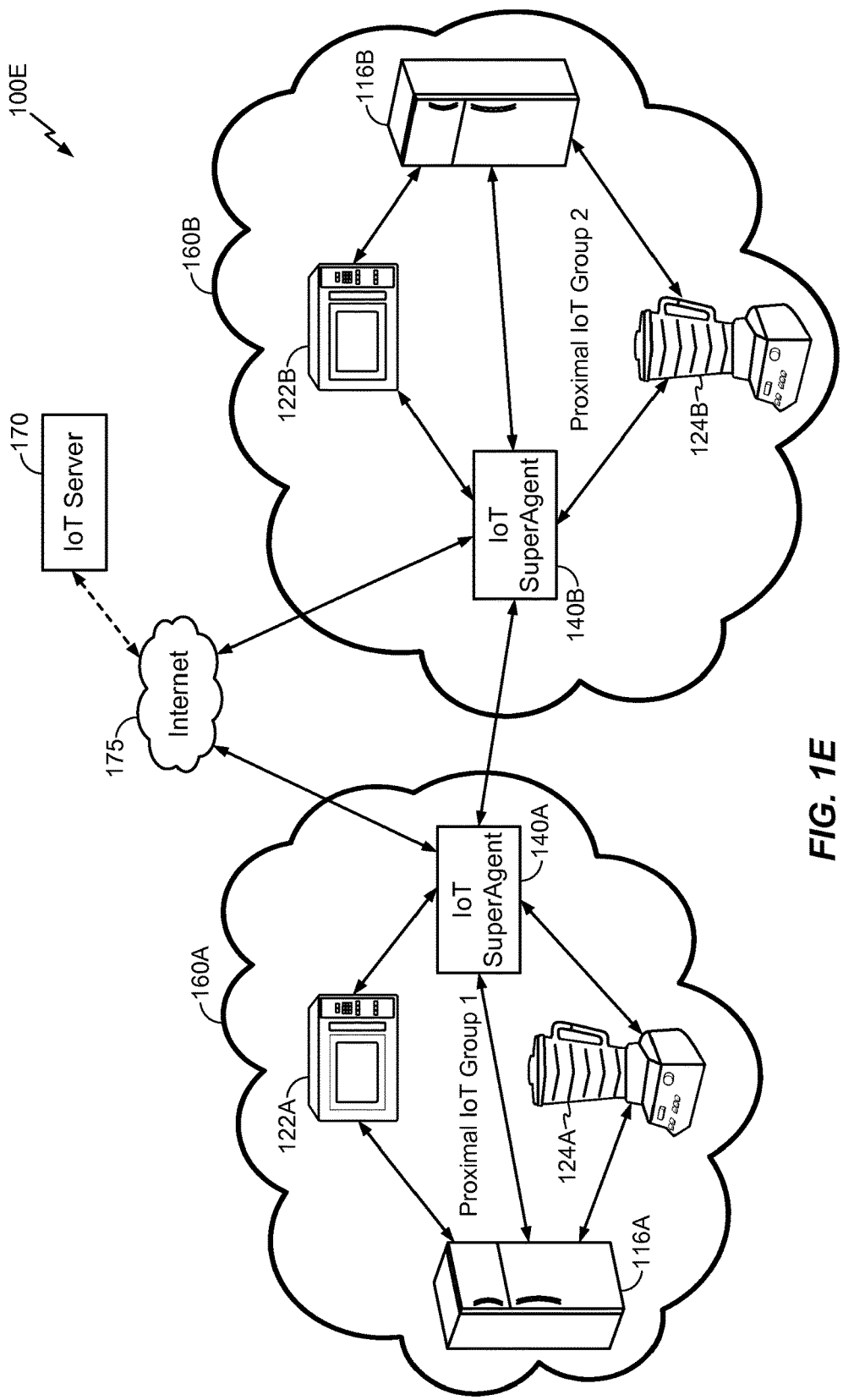
FIG. 1E illustrates a high-level system architecture of a wireless communications system in accordance with an aspect of the disclosure.

In accordance with another aspect of the disclosure, FIG. 1E illustrates a high-level architecture of another wireless communications system 100E that contains a plurality of IoT devices. In general, the wireless communications system 100E shown in FIG. 1E may include various components that are the same and/or substantially similar to the wireless communications systems 100A-D shown in FIGS. 1A-D, respectively, which were described in greater detail above. As such, for brevity and ease of description, various details relating to certain components in the wireless communications system 100E shown in FIG. 1E may be omitted herein to the extent that the same or similar details have already been provided above in relation to the wireless communications systems 100A-D illustrated in FIGS. 1A-D, respectively.

The communications system 100E includes two proximal IoT groups 160A and 160B. Multiple proximal IoT groups may be connected to and/or communicate with each other via an IoT SuperAgent connected to the Internet 175. At a high level, an IoT SuperAgent manages inter-group communications. In FIG. 1E, the proximal IoT group 160A includes IoT devices 116A, 122A, and 124A and an IoT SuperAgent 140A. The proximal IoT group 160B includes IoT devices 116B, 122B, and 124B and an IoT SuperAgent 140B. IoT SuperAgents 140A and 140B are connected to Internet 175 and may communicate with each other over the Internet 175 or directly. The IoT SuperAgents 140A and 140B facilitate communication between the proximal IoT groups 160A and 160B. Although FIG. 1E illustrates two proximal IoT groups communicating with each other via IoT SuperAgents 140A and 140B, any number of proximal IoT groups may communicate with each other using IoT SuperAgents.

Figure 2A:
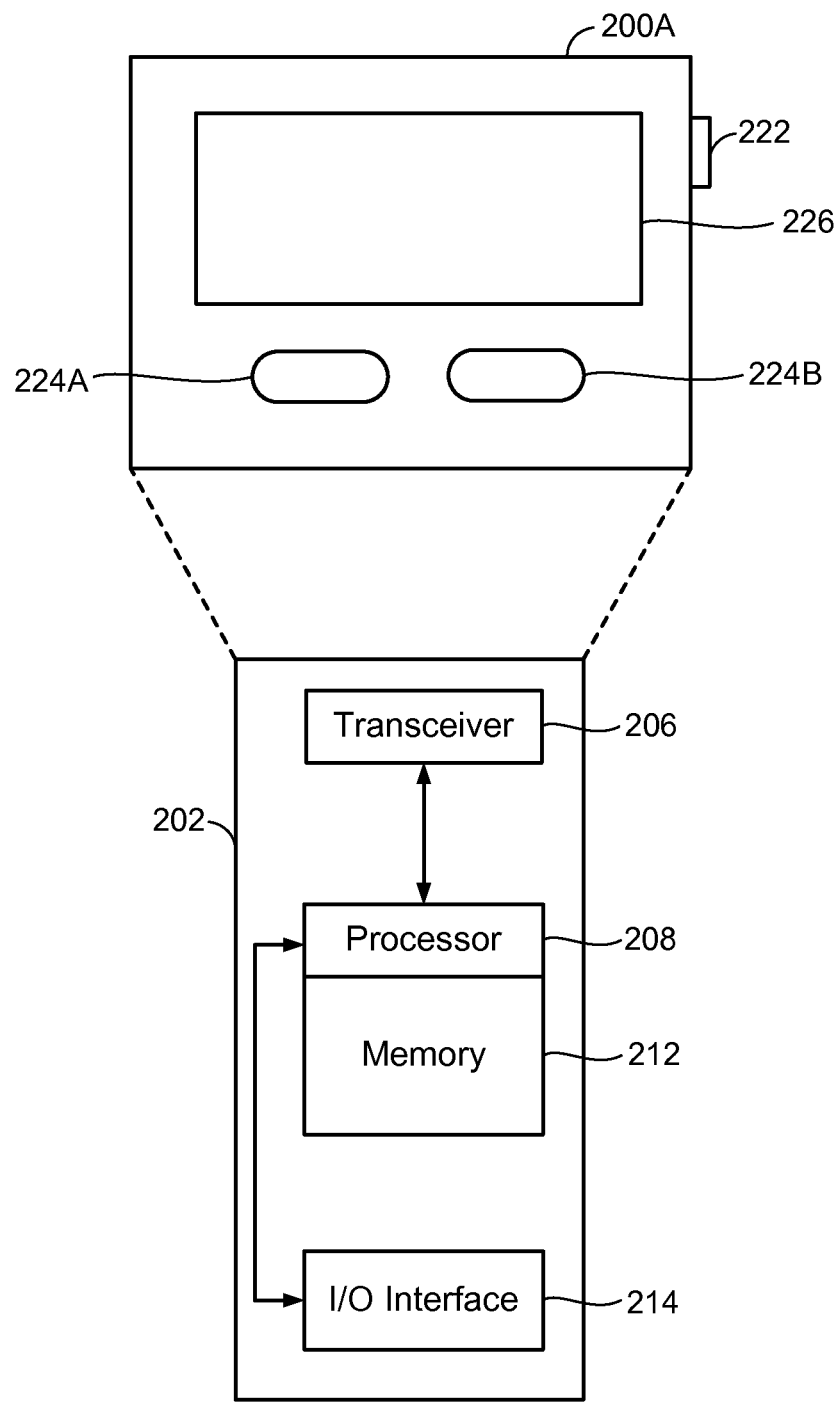

FIG. 2A illustrates a high-level example of an IoT device 200A in accordance with aspects of the disclosure. While external appearances and/or internal components can differ significantly among IoT devices, most IoT devices will have some sort of user interface, which may comprise a display and a means for user input. IoT devices without a user interface can be communicated with remotely over a wired or wireless network, such as air interface 108 in FIGS. 1A-B and D.

As shown in FIG. 2A, in an example configuration for the IoT device 200A, an external casing of IoT device 200A may be configured with a display 226, a power button 222, and two control buttons 224A and 224B, among other components, as is known in the art. The display 226 may be a touchscreen display, in which case the control buttons 224A and 224B may not be necessary. While not shown explicitly as part of IoT device 200A, the IoT device 200A may include one or more external antennas and/or one or more integrated antennas that are built into the external casing, including but not limited to Wi-Fi antennas, cellular antennas, satellite position system (SPS) antennas (e.g., global positioning system (GPS) antennas), and so on.

While internal components of IoT devices, such as IoT device 200A, can be embodied with different hardware configurations, a basic high-level configuration for internal hardware components is shown as platform 202 in FIG. 2A. The platform 202 can receive and execute software applications, data and/or commands transmitted over a network interface, such as air interface 108 in FIGS. 1A-B and D and/or a wired interface. The platform 202 can also independently execute locally stored applications. The platform 202 can include one or more transceivers 206 configured for wired and/or wireless communication (e.g., a Wi-Fi transceiver, a Bluetooth transceiver, a cellular transceiver, a satellite transceiver, a GPS or SPS receiver, etc.) operably coupled to one or more processors 208, such as a microcontroller, microprocessor, application specific integrated circuit, digital signal processor (DSP), programmable logic circuit, or other data processing device, which will be generally referred to as processor 208. The processor 208 can execute application programming instructions within a memory 212 of the IoT device. The memory 212 can include one or more of read-only memory (ROM), random-access memory (RAM), electrically erasable programmable ROM (EEPROM), flash cards, or any memory common to computer platforms. One or more input/output (I/O) interfaces 214 can be configured to allow the processor 208 to communicate with and control from various I/O devices such as the display 226, power button 222, control buttons 224A and 224B as illustrated, and any other devices, such as sensors, actuators, relays, valves, switches, and the like associated with the IoT device 200A.

Accordingly, an aspect of the disclosure can include an IoT device (e.g., IoT device 200A) including the ability to perform the functions described herein. As will be appreciated by those skilled in the art, the various logic elements can be embodied in discrete elements, software modules executed on a processor (e.g., processor 208) or any combination of software and hardware to achieve the functionality disclosed herein. For example, transceiver 206, processor 208, memory 212, and I/O interface 214 may all be used cooperatively to load, store and execute the various functions disclosed herein and thus the logic to perform these functions may be distributed over various elements. Alternatively, the functionality could be incorporated into one discrete component. Therefore, the features of the IoT device 200A in FIG. 2A are to be considered merely illustrative and the disclosure is not limited to the illustrated features or arrangement.

Figure 2B:
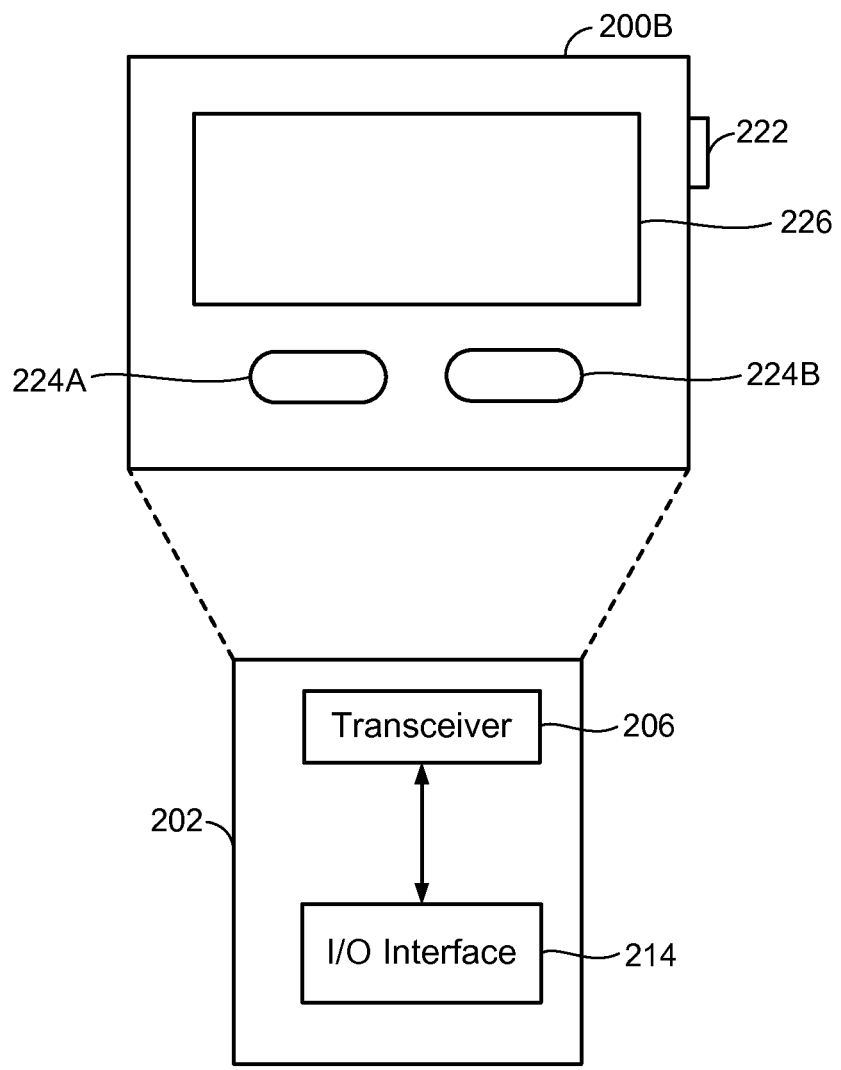
FIG. 2B illustrates an exemplary passive IoT device in accordance with aspects of the disclosure.

FIG. 2B illustrates a high-level example of a passive IoT device 200B in accordance with aspects of the disclosure. In general, the passive IoT device 200B shown in FIG. 2B may include various components that are the same and/or substantially similar to the IoT device 200A shown in FIG. 2A, which was described in greater detail above. As such, for brevity and ease of description, various details relating to certain components in the passive IoT device 200B shown in FIG. 2B may be omitted herein to the extent that the same or similar details have already been provided above in relation to the IoT device 200A illustrated in FIG. 2A.

The passive IoT device 200B shown in FIG. 2B may generally differ from the IoT device 200A shown in FIG. 2A in that the passive IoT device 200B may not have a processor, internal memory, or certain other components. Instead, in one embodiment, the passive IoT device 200B may only include an I/O interface 214 or other suitable mechanism that allows the passive IoT device 200B to be observed, monitored, controlled, managed, or otherwise known within a controlled IoT network. For example, in one embodiment, the I/O interface 214 associated with the passive IoT device 200B may include a barcode, Bluetooth interface, radio frequency (RF) interface, RFID tag, IR interface, NFC interface, or any other suitable I/O interface that can provide an identifier and attributes associated with the passive IoT device 200B to another device when queried over a short range interface (e.g., an active IoT device, such as IoT device 200A, that can detect, store, communicate, act on, or otherwise process information relating to the attributes associated with the passive IoT device 200B).

Although the foregoing describes the passive IoT device 200B as having some form of RF, barcode, or other I/O interface 214, the passive IoT device 200B may comprise a device or other physical object that does not have such an I/O interface 214. For example, certain IoT devices may have appropriate scanner or reader mechanisms that can detect shapes, sizes, colors, and/or other observable features associated with the passive IoT device 200B to identify the passive IoT device 200B. In this manner, any suitable physical object may communicate its identity and attributes and be observed, monitored, controlled, or otherwise managed within a controlled IoT network.

Figure 3:
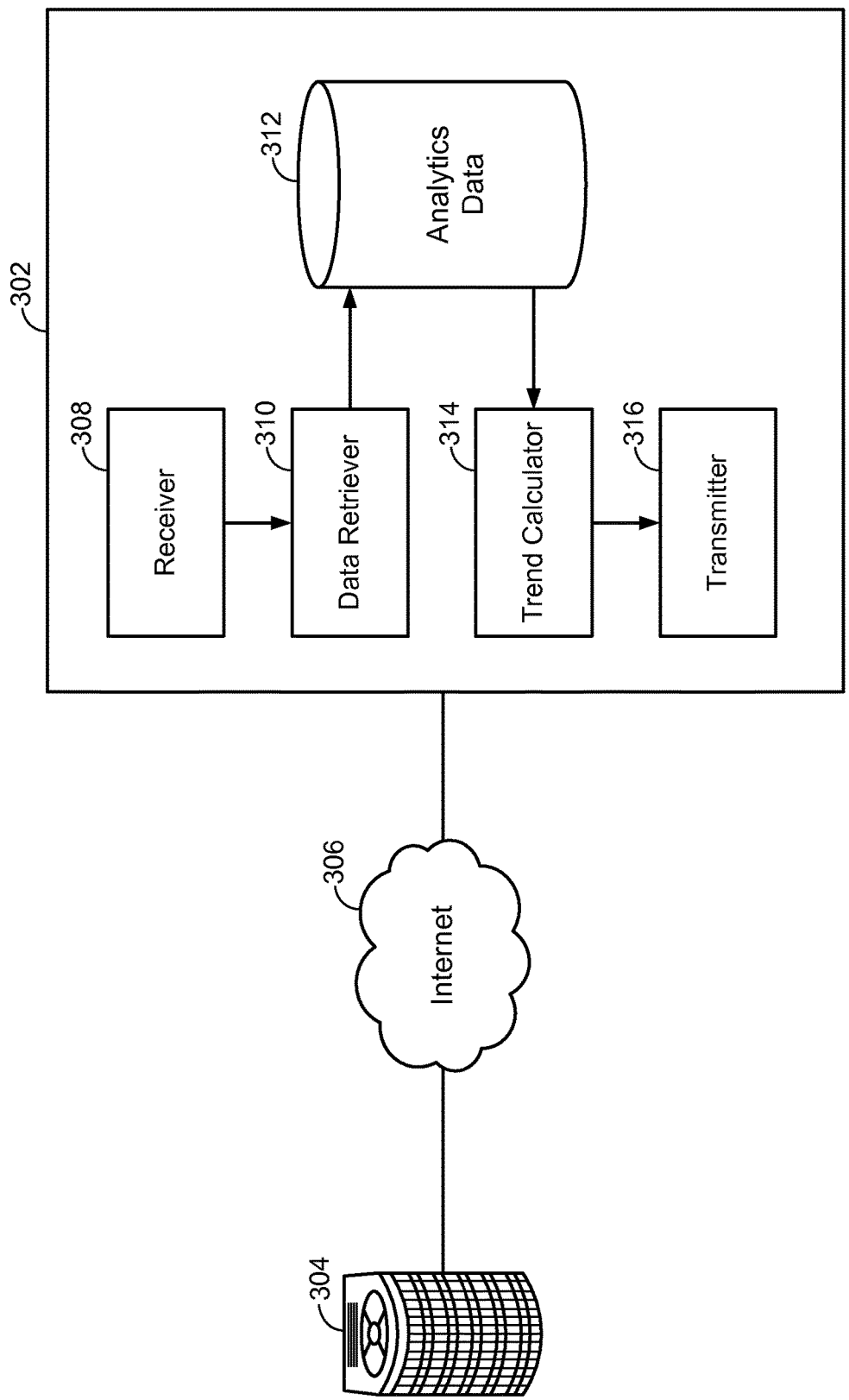
FIG. 3 an embodiment of an analytics engine in communication with an IoT device through the Internet.

FIG. 3 illustrates an embodiment of an analytics engine 302 in communication with an IoT device 304 through the Internet 306. In FIG. 3, the analytics engine 302 includes a receiver 308, a data retriever 310, an analytics data store 312, a trend calculator 314, and a transmitter 316.

The IoT device 304 can transmit data to the analytics engine 302 to be stored in the analytics data store 312. This transmission can occur on a periodic basis (e.g., daily, weekly, monthly, annually, etc.), or it can occur in real time. In FIG. 3, the analytics data store 312 is shown as part of the analytics engine 302. In some embodiments, the analytics data store 312 can be shared among multiple analytics engines. In some embodiments, the analytics data store 312 may be shared, but separate from any analytics engine.

The analytics engine 302 can receive, at the receiver 308, a request for trend data based on data stored in the analytics data store 312. In some embodiments, the requesting entity can be an IoT device. In some embodiments, the requesting entity can be a non-IoT device, such as a server from a corporation. For example, a utility company can request trending data to determine plans for energy production. The request can include a request for data associated with a group of IoT devices.

Once the receiver 308 receives the request, the data retriever 310 determines what data is requested and sends a retrieval request to the analytics data store 312. In some embodiments, the request for trending data can include historical data from the requesting entity. For example, if the requesting entity is an IoT device 304, the IoT device 304 can be transmitting a request along with its own historical data pertinent to the request. The request can also include historical data from another IoT device that is in the same group as the requesting IoT device 304. For example, if there are two air conditioning IoT units on the same street, the data from the non-requesting unit can also be sent with the request.

The trend calculator 314 can then obtain the requested data and calculate the requested trend data. The transmitter 316 can transmit the calculated trend data from the analytics engine 302 to the requesting entity. The requesting device, shown as the IoT device 304 in FIG. 3, can adjust parameters of the IoT device based on the requested trend data. In some embodiments, such as when the requesting entity is a server from a utility company, the calculated trend data can be used to adjust parameters in more than one IoT device in a group. For example, the utility company can use the calculated trend data to adjust the output of various sources of energy, such as windmills, hydroelectric plants, and solar panel grids.

Optionally, a prediction calculator (not shown) in the analytics engine 302 can also calculate predictions based on the trend data. For example, weather analytics can predict poor winds, leading to lower wind mill energy output. Such predictions can be utilized by IoT devices to conserve resources.

Various IoT devices can be part of one or more groups of IoT devices, such as groups based on geographical location, function, ownership, make, model, operating system, etc. An IoT device can transfer from one IoT group to another in some instances (e.g., change in geographical location, occupancy of location, ownership, or operating system). An IoT device may also be associated with more than one analytics engine. For example, an IoT washer/dryer can be in a group of IoT devices that consume water and another group that consumes electricity.

Figure 4:
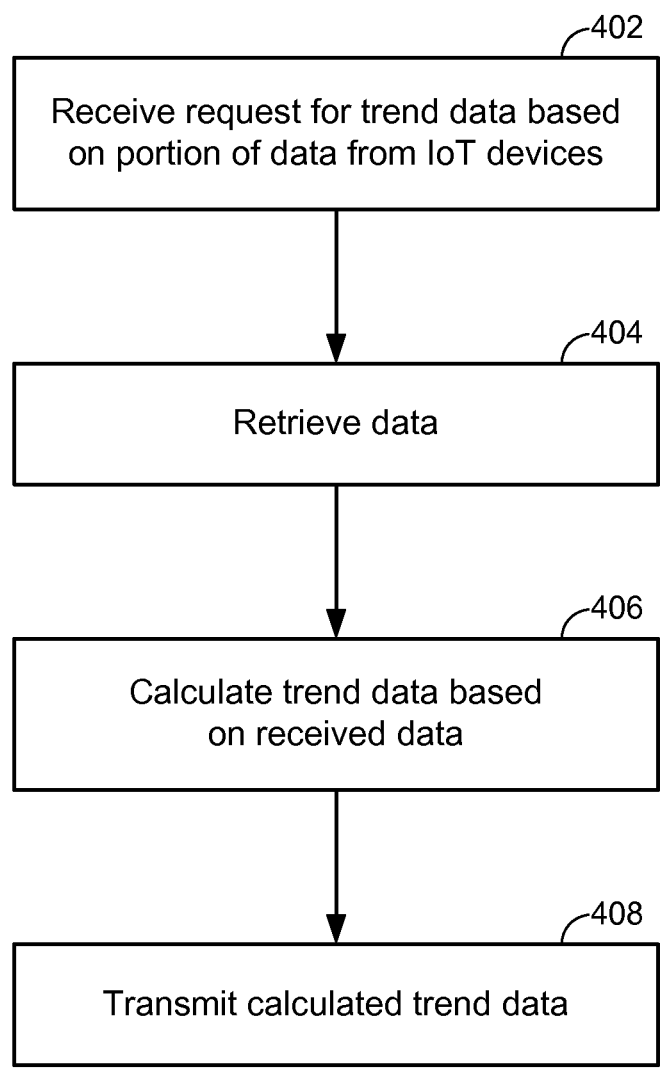
FIG. 4 illustrates an operational flow of a method for optimizing performance using an analytics engine.

FIG. 4 illustrates an embodiment that can include a method for optimizing performance using an analytics engine comprising: receiving, from a requesting Internet of Things (IoT) device, a request for trend data of physical resource consumption (e.g., historical data from the requesting IoT device and/or historical data from at least one device in a group with the requesting IoT device) based at least in part on a portion of received data from at least one of a plurality of IoT devices (e.g., data from multiple hot water consuming IoT devices)—Block 402; retrieving, from memory of an analytics engine, at least the portion of the received data (e.g., retrieve November data for hot water consuming IoT devices)—Block 404; calculating, in a calculator of the analytics engine, the trend data based on at least the portion of the received data (e.g., calculating the average household consumption of hot water in November)—Block 406; and transmitting, to the requesting IoT device, the calculated trend data, wherein the requesting IoT device adjusts parameters in an IoT device using the calculated trend data (e.g., transmitting the average household consumption of hot water in November to the hot water heater)—Block 408.

In some embodiments, data may be periodically transmitted from the at least one IoT device to be stored in memory. For example, weekly water consumption of a washing machine can be stored. In some embodiments, data is transmitted from the at least one IoT device in real time to be stored in memory. For example, bandwidth usage can be stored as it is used in a home.

In some embodiments, the requesting IoT device delays adjusting parameters after calculating the trend data. For example, an air conditioning unit can determine that it should shut off in four hours based on historical data calculated. In some embodiments, the requesting IoT device uses the calculated trend data to adjust parameters in more than one IoT device in a group. For example, the calculated data can be used by all IoT devices that are connected to a wireless network. In some embodiments, the request for trend data comprises a request for data associated with a group of IoT devices.

In some embodiments, the memory storing the received data is shared among more than one analytics engine. In some embodiments, the method shown in FIG. 4 may further comprise calculating a prediction based at least in part on the trend data. For example, the hot water heater may determine how much energy it should consume prior to use based on the hot water consumed on that day a week before. In some embodiments, the IoT device transfers to a different group through at least one of the following transitions: occupancy of location, geographical location, ownership, and operating system.

Figure 5:
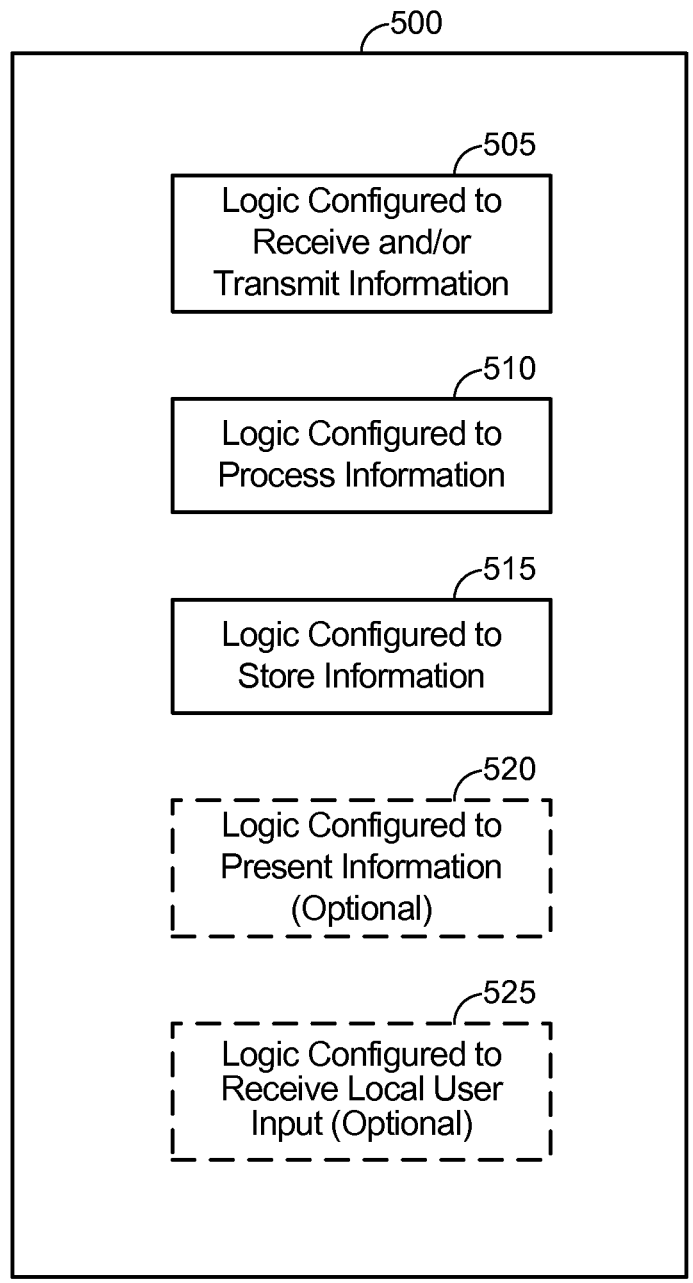
FIG. 5 illustrates a communication device that includes logic configured to optimize performance using an analytics engine.

FIG. 5 illustrates a communication device 500 that includes logic configured to perform functionality. The communication device 500 can correspond to any of the above-noted communication devices, including but not limited to IoT devices 110-118/120, IoT device 200A, any components coupled to the Internet 175 (e.g., the IoT server 170), and so on. Thus, communication device 500 can correspond to any electronic device that is configured to communicate with (or facilitate communication with) one or more other entities over the wireless communications systems 100A-E of FIGS. 1A-E.

Referring to FIG. 5, the communication device 500 includes logic configured to receive and/or transmit information 505. In an example, if the communication device 500 corresponds to a wireless communications device (e.g., IoT device 200A and/or passive IoT device 200B), the logic configured to receive and/or transmit information 505 can include a wireless communications interface (e.g., Bluetooth, Wi-Fi, Wi-Fi Direct, Long-Term Evolution (LTE) Direct, etc.) such as a wireless transceiver and associated hardware (e.g., an RF antenna, a MODEM, a modulator and/or demodulator, etc.). In another example, the logic configured to receive and/or transmit information 505 can correspond to a wired communications interface (e.g., a serial connection, a USB or Firewire connection, an Ethernet connection through which the Internet 175 can be accessed, etc.). Thus, if the communication device 500 corresponds to some type of network-based server (e.g., the IoT server 170), the logic configured to receive and/or transmit information 505 can correspond to an Ethernet card, in an example, that connects the network-based server to other communication entities via an Ethernet protocol. In a further example, the logic configured to receive and/or transmit information 505 can include sensory or measurement hardware by which the communication device 500 can monitor its local environment (e.g., an accelerometer, a temperature sensor, a light sensor, an antenna for monitoring local RF signals, etc.). The logic configured to receive and/or transmit information 505 can also include software that, when executed, permits the associated hardware of the logic configured to receive and/or transmit information 505 to perform its reception and/or transmission function(s). However, the logic configured to receive and/or transmit information 505 does not correspond to software alone, and the logic configured to receive and/or transmit information 505 relies at least in part upon hardware to achieve its functionality.

Referring to FIG. 5, the communication device 500 further includes logic configured to process information 510. In an example, the logic configured to process information 510 can include at least a processor. Example implementations of the type of processing that can be performed by the logic configured to process information 510 includes but is not limited to performing determinations, establishing connections, making selections between different information options, performing evaluations related to data, interacting with sensors coupled to the communication device 500 to perform measurement operations, converting information from one format to another (e.g., between different protocols such as .wmv to .avi, etc.), and so on. For example, the processor included in the logic configured to process information 510 can correspond to a general purpose processor, a DSP, an ASIC, a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration). The logic configured to process information 510 can also include software that, when executed, permits the associated hardware of the logic configured to process information 510 to perform its processing function(s). However, the logic configured to process information 510 does not correspond to software alone, and the logic configured to process information 510 relies at least in part upon hardware to achieve its functionality.

Referring to FIG. 5, the communication device 500 further includes logic configured to store information 515. In an example, the logic configured to store information 515 can include at least a non-transitory memory and associated hardware (e.g., a memory controller, etc.). For example, the non-transitory memory included in the logic configured to store information 515 can correspond to RAM, flash memory, ROM, erasable programmable ROM (EPROM), EEPROM, registers, hard disk, a removable disk, a CD-ROM, or any other form of storage medium known in the art. The logic configured to store information 515 can also include software that, when executed, permits the associated hardware of the logic configured to store information 515 to perform its storage function(s). However, the logic configured to store information 515 does not correspond to software alone, and the logic configured to store information 515 relies at least in part upon hardware to achieve its functionality.

Referring to FIG. 5, the communication device 500 further optionally includes logic configured to present information 520. In an example, the logic configured to present information 520 can include at least an output device and associated hardware. For example, the output device can include a video output device (e.g., a display screen, a port that can carry video information such as USB, HDMI, etc.), an audio output device (e.g., speakers, a port that can carry audio information such as a microphone jack, USB, HDMI, etc.), a vibration device and/or any other device by which information can be formatted for output or actually outputted by a user or operator of the communication device 500. For example, if the communication device 500 corresponds to the IoT device 200A as shown in FIG. 2A and/or the passive IoT device 200B as shown in FIG. 2B, the logic configured to present information 520 can include the display 226. In a further example, the logic configured to present information 520 can be omitted for certain communication devices, such as network communication devices that do not have a local user (e.g., network switches or routers, remote servers, etc.). The logic configured to present information 520 can also include software that, when executed, permits the associated hardware of the logic configured to present information 520 to perform its presentation function(s). However, the logic configured to present information 520 does not correspond to software alone, and the logic configured to present information 520 relies at least in part upon hardware to achieve its functionality.

Referring to FIG. 5, the communication device 500 further optionally includes logic configured to receive local user input 525. In an example, the logic configured to receive local user input 525 can include at least a user input device and associated hardware. For example, the user input device can include buttons, a touchscreen display, a keyboard, a camera, an audio input device (e.g., a microphone or a port that can carry audio information such as a microphone jack, etc.), and/or any other device by which information can be received from a user or operator of the communication device 500. For example, if the communication device 500 corresponds to the IoT device 200A as shown in FIG. 2A and/or the passive IoT device 200B as shown in FIG. 2B, the logic configured to receive local user input 525 can include the buttons 222, 224A, and 224B, the display 226 (if a touchscreen), etc. In a further example, the logic configured to receive local user input 525 can be omitted for certain communication devices, such as network communication devices that do not have a local user (e.g., network switches or routers, remote servers, etc.). The logic configured to receive local user input 525 can also include software that, when executed, permits the associated hardware of the logic configured to receive local user input 525 to perform its input reception function(s). However, the logic configured to receive local user input 525 does not correspond to software alone, and the logic configured to receive local user input 525 relies at least in part upon hardware to achieve its functionality.

Referring to FIG. 5, while the configured logics of 505 through 525 are shown as separate or distinct blocks in FIG. 5, it will be appreciated that the hardware and/or software by which the respective configured logic performs its functionality can overlap in part. For example, any software used to facilitate the functionality of the configured logics of 505 through 525 can be stored in the non-transitory memory associated with the logic configured to store information 515, such that the configured logics of 505 through 525 each performs their functionality (i.e., in this case, software execution) based in part upon the operation of software stored by the logic configured to store information 515. Likewise, hardware that is directly associated with one of the configured logics can be borrowed or used by other configured logics from time to time. For example, the processor of the logic configured to process information 510 can format data into an appropriate format before being transmitted by the logic configured to receive and/or transmit information 505, such that the logic configured to receive and/or transmit information 505 performs its functionality (i.e., in this case, transmission of data) based in part upon the operation of hardware (i.e., the processor) associated with the logic configured to process information 510.

Generally, unless stated otherwise explicitly, the phrase "logic configured to" as used throughout this disclosure is intended to invoke an aspect that is at least partially implemented with hardware, and is not intended to map to software-only implementations that are independent of hardware. Also, it will be appreciated that the configured logic or "logic configured to" in the various blocks are not limited to specific logic gates or elements, but generally refer to the ability to perform the functionality described herein (either via hardware or a combination of hardware and software). Thus, the configured logics or "logic configured to" as illustrated in the various blocks are not necessarily implemented as logic gates or logic elements despite sharing the word "logic." Other interactions or cooperation between the logic in the various blocks will become clear to one of ordinary skill in the art from a review of the aspects described below in more detail.

Figure 6:
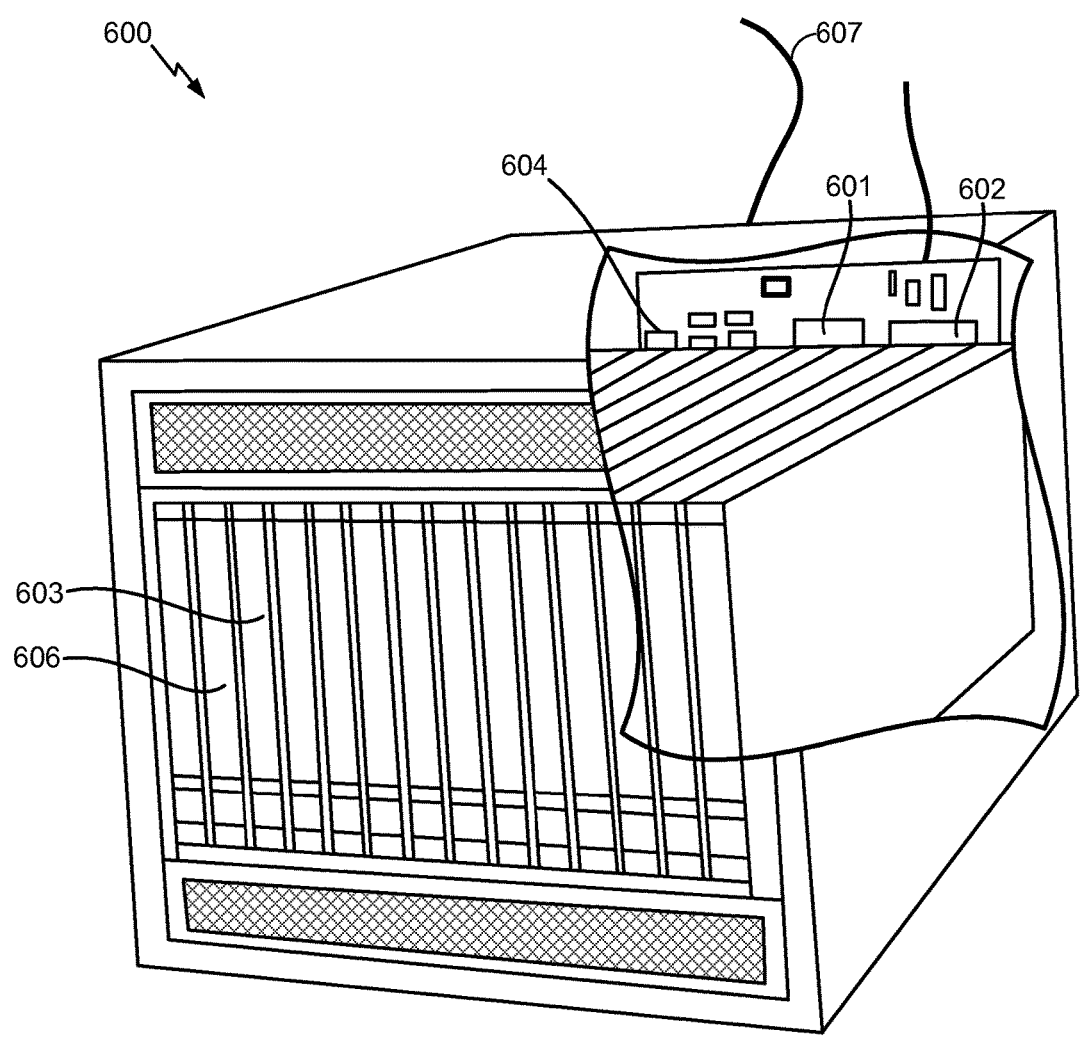
FIG. 6 illustrates an exemplary analytics engine server.

The various embodiments may be implemented on any of a variety of commercially available server devices, such as server 600 illustrated in FIG. 6. In an example, the server 600 may correspond to one example configuration of the IoT server 170 described above. In FIG. 6, the server 600 includes a processor 601 coupled to volatile memory 602 and a large capacity nonvolatile memory, such as a disk drive 603. The server 600 may also include a floppy disc drive, compact disc (CD) or DVD disc drive 606 coupled to the processor 601. The server 600 may also include network access ports 604 coupled to the processor 601 for establishing data connections with a network 607, such as a local area network coupled to other broadcast system computers and servers or to the Internet. In context with FIG. 5, it will be appreciated that the server 600 of FIG. 6 illustrates one example implementation of the communication device 500, whereby the logic configured to transmit and/or receive information 505 corresponds to the network access points 604 used by the server 600 to communicate with the network 607, the logic configured to process information 510 corresponds to the processor 601, and the logic configuration to store information 515 corresponds to any combination of the volatile memory 602, the disk drive 603 and/or the disc drive 606. The optional logic configured to present information 520 and the optional logic configured to receive local user input 525 are not shown explicitly in FIG. 6 and may or may not be included therein. Thus, FIG. 6 helps to demonstrate that the communication device 500 may be implemented as a server, in addition to an IoT device implementation as in FIG. 2A.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Further, those of skill in the art will appreciate that the various illustrative logical blocks, modules, circuits, and algorithm steps described in connection with the aspects disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The methods, sequences and/or algorithms described in connection with the aspects disclosed herein may be embodied directly in hardware, in a software module executed by a processor, or in a combination of the two. A software module may reside in RAM, flash memory, ROM, EPROM, EEPROM, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in an electronic object. In the alternative, the processor and the storage medium may reside as discrete components in a user terminal.

In one or more exemplary aspects, the functions described may be implemented in hardware, software, firmware, or any combination thereof. If implemented in software, the functions may be stored on or transmitted over as one or more instructions or code on a computer-readable medium. Computer-readable media includes both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, DSL, or wireless technologies such as infrared, radio, and microwave, then the coaxial cable, fiber optic cable, twisted pair, DSL, or wireless technologies such as infrared, radio, and microwave are included in the definition of medium. Disk and disc, as used herein, includes CD, laser disc, optical disc, DVD, floppy disk and Blu-ray disc where disks usually reproduce data magnetically, while discs reproduce data optically with lasers. Combinations of the above should also be included within the scope of computer-readable media.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method to optimize performance using data from an Internet of Things (IoT) device with an analytics engine, the method comprising:

storing, in a memory of the analytics engine, usage data related to consumption of at least one physical resource by a plurality of IoT devices in an IoT device group;

receiving, from a requesting device, a request for trend data related to the consumption of the at least one physical resource by the plurality of IoT devices in the IoT device group;

retrieving, from the memory of the analytics engine, at least a portion of the usage data related to the consumption of the at least one physical resource by the plurality of IoT devices;

calculating, in a calculator of the analytics engine, the trend data based on at least the retrieved portion of the usage data related to the consumption of the at least one physical resource by the plurality of IoT devices; and transmitting the calculated trend data to the requesting device, wherein the requesting device is configured to adjust one or more parameters in at least one of the plurality of IoT devices in the IoT device group using the calculated trend data.

2. The method of claim 1, further comprising periodically receiving the usage data related to the consumption of the at least one physical resource from at least one of the plurality of IoT devices in the IoT device group.

3. The method of claim 1, further comprising receiving the usage data related to the consumption of the at least one physical resource from at least one of the plurality of IoT devices in the IoT device group in real time.

4. The method of claim 1, wherein the request from the requesting device comprises historical data from the requesting device pertinent to the request for the trend data related to the consumption of the at least one physical resource by the plurality of IoT devices in the IoT device group.

5. The method of claim 4, wherein the requesting device is one of the plurality of IoT devices in the IoT device group and wherein the request from the requesting device further comprises historical data from one or more other IoT devices in the IoT device group with the requesting device.

6. The method of claim 1, wherein the requesting device is configured to delay adjusting the one or more parameters after the trend data is calculated.

7. The method of claim 1, wherein the requesting device is configured to use the calculated trend data to adjust the one or more parameters in more than one of the plurality of IoT devices in the IoT device group.

8. The method of claim 1, wherein the plurality of IoT devices are in the IoT device group based on the plurality of IoT devices each being configured to consume the at least one physical resource.

9. The method of claim 1, further comprising sharing the usage data related to the consumption of the at least one physical resource by the plurality of IoT devices with another analytics engine.

10. The method of claim 1, further comprising calculating a prediction based at least in part on the trend data.

11. The method of claim 10, wherein the prediction relates to an amount of the at least one physical resource available to be consumed.

12. The method of claim 1, wherein one or more of the plurality of IoT devices are configured to transfer to or from the IoT device group based on a transition relating to at least one of occupancy of location, geographical location, function, ownership, make, model, or operating system.

13. The method of claim 1, wherein the requesting device comprises a utility company server configured to adjust production of the at least one physical resource based at least on part on the trend data related to the consumption of the at least one physical resource by the plurality of IoT devices in the IoT device group.

14. The method of claim 1, wherein the calculated trend data indicates a pattern in the consumption of the at least one physical resource by the plurality of IoT devices in the IoT device group over a particular time period.

15. An apparatus comprising:

logic configured to store usage data related to consumption of at least one physical resource by a plurality of Internet of Things (IoT) devices in an IoT device group;

logic configured to receive, from a requesting device, a request for trend data related to the consumption of the at least one physical resource by the plurality of IoT devices in the IoT device group;

logic configured to retrieve at least a portion of the stored usage data related to the consumption of the at least one physical resource by the plurality of IoT devices;

logic configured to calculate the trend data based on at least the retrieved portion of the usage data related to the consumption of the at least one physical resource by the plurality of IoT devices; and logic configured to transmit the calculated trend data to the requesting device, wherein the requesting device is configured to adjust one or more parameters in at least one of the plurality of IoT devices in the IoT device group using the calculated trend data.

16. The apparatus of claim 15, further comprising logic configured to periodically receive the usage data related to the consumption of the at least one physical resource from at least one of the plurality of IoT devices in the IoT device group.

17. The apparatus of claim 15, further comprising logic configured to receive the usage data related to the consumption of the at least one physical resource from at least one of the plurality of IoT devices in the IoT device group in real time.

18. The apparatus of claim 15, wherein the requesting device is configured to delay adjusting the one or more parameters after the trend data is calculated.

19. The apparatus of claim 15, wherein the requesting device is configured to use the calculated trend data to adjust the one or more parameters in more than one of the plurality of IoT devices in the IoT device group.

20. The apparatus of claim 15, wherein the plurality of IoT devices are in the IoT device group based on the plurality of IoT devices each being configured to consume the at least one physical resource.

21. The apparatus of claim 15, further comprising logic configured to share the usage data related to the consumption of the at least one physical resource by the plurality of IoT devices with another analytics engine.

22. The apparatus of claim 15, further comprising logic configured to calculate a prediction based at least in part on the trend data.

23. An analytics engine comprising:

a memory configured to store usage data related to consumption of at least one physical resource by a plurality of Internet of Things (IoT) devices in an IoT device group;

a receiver configured to receive, from a requesting device, a request for trend data related to the consumption of the at least one physical resource by the plurality of IoT devices in the IoT device group;

a data retriever configured to retrieve, from the memory, at least a portion of the usage data related to the consumption of the at least one physical resource by the plurality of IoT devices;

a calculator configured to calculate the trend data based on at least the retrieved portion of the usage data related to the consumption of the at least one physical resource by the plurality of IoT devices; and a transmitter configured to transmit the calculated trend data to the requesting device, wherein the requesting device is configured to adjust one or more parameters in at least one of the plurality of IoT devices in the IoT device group using the calculated trend data.

24. The analytics engine of claim 23, wherein the receiver is further configured to periodically receive the usage data related to the consumption of the at least one physical resource from at least one of the plurality of IoT devices in the IoT device group.

25. The analytics engine of claim 23, wherein the receiver further configured to receive the usage data related to the consumption of the at least one physical resource from at least one of the plurality of IoT devices in the IoT device group in real time.

26. The analytics engine of claim 23, wherein the requesting device is configured to delay adjusting the one or more parameters the trend data is calculated.

27. The analytics engine of claim 23, wherein the requesting device is configured to use the calculated trend data to adjust the one or more parameters in more than one of the plurality of IoT devices in the IoT device group.

28. The analytics engine of claim 23, wherein the plurality of IoT devices are in the IoT device group based on the plurality of IoT devices each being configured to consume the at least one physical resource.

29. The analytics engine of claim 23, wherein the usage data related to the consumption of the at least one physical resource is shared with another analytics engine.

30. The analytics engine of claim 23, wherein the calculator is further configured to calculate a prediction based at least in part on the trend data.

31. A non-transitory computer-readable storage medium comprising code, which, when executed by a processor, causes the processor to:

store, in a memory, usage data related to consumption of at least one physical resource by a plurality of Internet of Things (IoT) devices in an IoT device group;

receive, from a requesting device, a request for trend data related to the consumption of the at least one physical resource by the plurality of IoT devices in the IoT device group;

retrieve, from the memory, at least a portion of the usage data related to the consumption of the at least one physical resource by the plurality of IoT devices;

calculate the trend data based on at least the retrieved portion of the usage data related to the consumption of the at least one physical resource by the plurality of IoT devices; and transmit the calculated trend data to the requesting device, wherein the requesting device is configured to adjust one or more parameters in at least one of the plurality of IoT devices in the IoT device group using the calculated trend data.

32. The non-transitory computer-readable storage medium of claim 31, wherein the usage data related to the consumption of the at least one physical resource is periodically received from at least one of the plurality of IoT devices in the IoT device group.

33. The non-transitory computer-readable storage medium of claim 31, wherein the requesting device is configured to delay adjusting the one or more parameters after the trend data is calculated.

* * * * *